(12) United States Patent
Mishima

(10) Patent No.: US 7,615,937 B2
(45) Date of Patent: Nov. 10, 2009

(54) HIGH-PRESSURE DISCHARGE LAMP LIGHTING DEVICE AND LIGHTING FIXTURE

(75) Inventor: Masanori Mishima, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 651 days.

(21) Appl. No.: 10/598,463

(22) PCT Filed: Mar. 25, 2005

(86) PCT No.: PCT/JP2005/005508

§ 371 (c)(1),
(2), (4) Date: Aug. 31, 2006

(87) PCT Pub. No.: WO2005/094137

PCT Pub. Date: Oct. 6, 2005

(65) Prior Publication Data

US 2007/0170873 A1      Jul. 26, 2007

(30) Foreign Application Priority Data

Mar. 26, 2004   (JP) .............................. 2004-091111

(51) Int. Cl.
*G05F 1/00* (2006.01)
(52) U.S. Cl. .................... 315/291; 315/307; 315/308; 315/224; 315/209 R; 315/289; 315/DIG. 4
(58) Field of Classification Search ............. 315/209 R, 315/247, 287, 289–291, 224, 307, 308, 360, 315/DIG. 4, DIG. 5, DIG. 7
See application file for complete search history.

(56) References Cited

U.S. PATENT DOCUMENTS 6,066,921 A    5/2000   Nakamura et al.

(Continued)

FOREIGN PATENT DOCUMENTS

JP           4-253182       9/1992

(Continued)

OTHER PUBLICATIONS

English language Abstract of JP 2003-223997.

(Continued)

*Primary Examiner*—Haissa Philogene
(74) *Attorney, Agent, or Firm*—Greenblum & Bernstein P.L.C.

(57) ABSTRACT

An object of the invention is to provide a high-pressure discharge lamp lighting device capable of executing dimming up to a lower luminous flux level than the dimming lower limit obtained by performing constant-current control in related arts.

A high-pressure discharge lamp lighting device of the invention includes power conversion unit for supplying AC power to a high-pressure discharge lamp as a load with a DC power supply as an input power supply for performing all lighting or dimming lighting. In an area where the voltage across the high-pressure discharge lamp grows as dimming deepens, the output characteristic of the power conversion unit is a characteristic for increasing the output current of the power conversion unit in response to an increase in the output voltage of the power conversion unit. The ratio of the increase in the output current to the increase in the output voltage is made roughly constant or the ratio of the increase in the output current to the increase in the output voltage is made larger as dimming becomes deeper.

13 Claims, 14 Drawing Sheets

U.S. PATENT DOCUMENTS

| | | | |
|---|---|---|---|
| 6,548,963 B2 * | 4/2003 | Van Casteren et al. | ... 315/209 R |
| 6,943,503 B2 * | 9/2005 | Ozasa et al. | ................. 315/224 |
| 7,129,650 B2 | 10/2006 | Komatsu et al. | |
| 7,425,802 B2 * | 9/2008 | Kumagai et al. | ............ 315/291 |

FOREIGN PATENT DOCUMENTS

| | | |
|---|---|---|
| JP | 6-111987 | 4/1994 |
| JP | 8-222392 | 8/1996 |
| JP | 2003-086391 | 3/2003 |
| JP | 2003-133096 | 5/2003 |
| JP | 2003-133098 | 5/2003 |
| JP | 2003-223997 | 8/2003 |

OTHER PUBLICATIONS

English language Abstract of JP6-111987.
English language Abstract of JP4-253182.
English language Abstract of JP 2003-133096.
English language Abstract of JP 2003-086391.
English language Abstract of JP 2003-133098.
English language Abstract of JP 8-222392.

* cited by examiner

HIGH-PRESSURE DISCHARGE LAMP LIGHTING DEVICE AND LIGHTING FIXTURE

TECHNICAL FIELD

This invention relates to a high-pressure discharge lamp lighting device and a lighting fixture using it.

BACKGROUND ART

JP-A-2003-223997 proposes a high-pressure discharge lamp lighting device having a capability of deep dimming. FIG. 22 shows change rate of lamp power to voltage across lamp V1a. Circuit operates at the intersection point of the output characteristic of a lighting device indicated by a dotted line a, b in the figure and the lamp characteristic indicated by a heavy solid line c. If the circuit is thus operated, a constant-voltage characteristic can be taken in a comparatively high output dimming range (for example, 40% to 100%) until the voltage across lamp V1a turns to rise as shown in a in FIG. 22, and roughly constant power can be obtained for fluctuation of lamp impedance caused by the individual difference and the life of lamp; the circuit operates with a constant-current characteristic in a comparatively low output dimming range (for example, 40% or less) where the voltage across lamp V1a turns to rise as shown in b in FIG. 22, so that an operation point of an intersection point with the lamp characteristic can be taken, gong out does not occur, stable lighting can be performed, and the dimming range can be enlarged.

FIG. 23 shows target values of lamp current Ila in output characteristics a and b in FIG. 22. As described above, the target value of the lamp current Ila is decreased in response to an increase in the voltage across lamp V1a in the dimming area of the output characteristic a, thereby performing rough constant-power control, and the target value of the lamp current Ila is made constant in response to an increase in the voltage across lamp V1a in the dimming area of the output characteristic b, thereby performing constant-current control.

A discharge lamp lighting device of a characteristic as shown in JP-A-6-111987 is also known for the purpose of widening the dimming range. FIG. 24 shows the characteristic and shows lamp voltage V1a relative to lamp current Ila of the discharge lamp lighting device. Assuming that the current command value at the instant at which the lamp voltage V1a exceeds a threshold value Vth is X, if adjustment is made so as to output a current command value Y or Z lower than X, it crosses voltage-current curve Q of discharge lamp at a y point or a z point and the light state can be still maintained. Thus, when the lamp voltage V1a is lower than the threshold value Vth, constant-power dimming is performed, and constant-current dimming is performed in the range in which the lamp voltage V1a is equal to or greater than the threshold value Vth. This means that the dimming range is widened to a smaller luminance area.

Patent document 1: JP-A-2003-223997
Patent document 2: JP-A-6-111987

DISCLOSURE OF THE INVENTION

Problems to be Solved by the Invention

In the arts in patent documents 1 and 2, the lighting device is provided with a constant-current characteristic to dim the high-pressure discharge lamp to a low luminous flux level for reliably maintaining the operation point of the output characteristic of the lighting device and the lamp characteristic as compared with dimming control based on constant power. However, for example, in a deeper dimming area with illuminance ratio 20% or less assuming that the rated lighting time is 100%, the lamp voltage rises rapidly as the dimming becomes deeper as indicated by the heavy solid line c in FIG. 22 and thus it becomes difficult to maintain the operation point of the lighting device and the lamp characteristic, resulting in occurrence of going out; this is a defect.

It is therefore an object of the invention to provide a high-pressure discharge lamp lighting device capable of executing dimming up to a lower luminous flux level than the dimming lower limit obtained by performing constant-current control as described in the related art example.

Means for Solving the Problems

To solve the problem described above, according to the invention, there is provided a high-pressure discharge lamp lighting device including a power conversion unit 1 for supplying AC power to a high-pressure discharge lamp DL as a load with a DC power supply E as an input power supply for performing all lighting or dimming lighting as shown in FIG. 2, wherein in an area where the voltage across the high-pressure discharge lamp DL grows as dimming deepens, the output characteristic of the power conversion unit 1 is a characteristic for increasing the output current of the power conversion unit 1 in response to an increase in the output voltage of the power conversion unit 1 as shown in characteristic BC1 in FIG. 1(b).

Advantages of the Invention

According to the invention as claimed in claim 1, low luminous lighting can be stably executed in a wider range as compared with the constant-current control in the related art.

According to the invention as claimed in claim 2, change amount of lamp current/change amount of lamp voltage is made constant, whereby control can be facilitated.

According to the invention as claimed in claim 3, if dimming is deepened, the operation point is provided reliably, so that low luminous lighting can be stably executed in a wider range.

According to the invention as claimed in claim 4, after start, the output characteristic of the lighting device is provided from lamp voltage 0 V to the voltage at the operation point, so that low luminous dimming starting can be executed reliably, for example.

According to the invention as claimed in claim 5, the value of the lamp voltage at the switch point between constant-current control and the operation according to the invention is changed in response to dimming, so that brightness adjustment in a low luminous area can be made easily.

According to the invention as claimed in claim 6, the lamp power in the vicinity of the dimming lower limit can be set to power at the same degree as that at the initial time for variation of the lamp with time.

According to the invention as claimed in claim 7, smooth and continuous control can be executed in a wide range of the rated lighting to the dimming lower limit using the constant-power control, the intermediate control of the constant-power control and the constant-current control, the constant-current control, and the low luminous lighting time control of the invention in combination.

According to the invention as claimed in claim 8, 9, 10, control can be facilitated and can be realized by a simple control circuit.

According to the invention as claimed in claim 11, the data table of the microcontroller is referenced, whereby the control operation switching circuit responsive to the lamp voltage, etc., becomes unnecessary and the circuit can be simplified.

According to the invention as claimed in claim 12, the amount of data to be stored in the data table of the microcontroller can be lessened.

According to the invention as claimed in claim 13, a lighting fixture that can be dimmed up to a lower level than that in the related arts can be provided.

DESCRIPTION OF REFERENCE NUMERALS

E DC power supply
1 Power conversion unit
2 Dimmer
3 DC/DC conversion unit
4 DC/AC conversion unit
5 Control circuit DL High-pressure discharge lamp

BEST MODE FOR CARRYING OUT THE INVENTION

First Embodiment

Figure 1A:
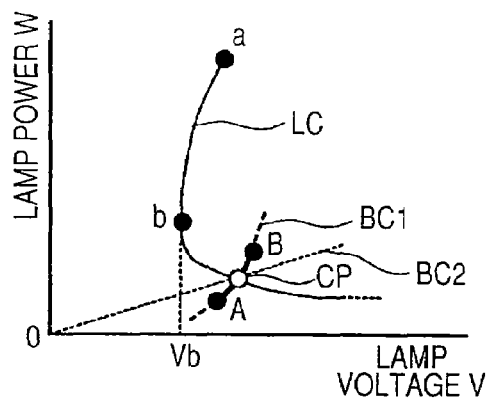
FIG. 1 is a characteristic drawing to show the operation of a first embodiment of the invention.

FIGS. 1(a) and (b) show the operation characteristics of a discharge lamp lighting device according to a first embodiment of the invention; FIG. 1(a) shows the output characteristic of a lighting device and lamp characteristic on a graph of lamp power W relative to lamp voltage V. In the figures, a solid line LC shown so as to pass through points a and b indicates the lamp characteristic and a line BC1 made up of a solid line and a dotted line shown so as to pass through points A and B indicates the output characteristic of the lighting device according to the embodiment. For comparison, the output characteristic based on constant-current control shown in the related art example is indicated by a dotted line BC2.

In the lamp characteristic LC, if dimming is deepened from the rated lighting indicated by the point a, namely, the lamp power W is lessened, the lamp voltage V becomes roughly constant or a little lowers. If dimming is still executed although the lamp voltage reaches one point (Vb), the lamp voltage rapidly rises after the point b.

At this time, an intersection point CP of the output characteristic BC1 of the lighting device and the lamp characteristic LC, indicated by a white circle becomes the operation point of the lamp. The output characteristic of the lighting device is made a characteristic like BC1, whereby the characteristic curves of the lamp characteristic LC and the output characteristic BC1 cross orthogonally and thus the operation point is reliably provided and when dimming is further deepened, it also becomes easy to maintain the operation point. Consequently, it is made possible to stably light up to deep dimming.

In this connection, in constant-current control as indicated in the related art example, namely, the output characteristic indicated by the dotted line BC2, the lamp also operates at the intersection point CP of the lamp characteristic LC and the output characteristic BC2; since the lamp characteristic LC and the output characteristic BC2 are close to each other in gradient as compared with the operation described above and thus if dimming is further deepened, going out easily occurs.

Figure 1B:
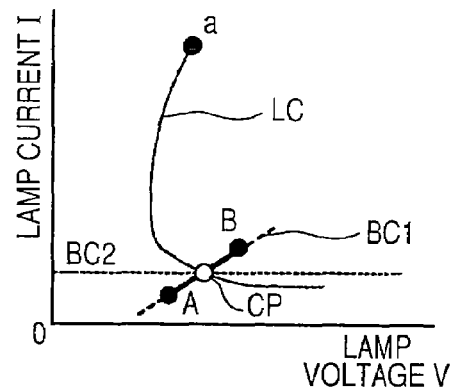

FIG. 1(b) is provided by replacing the characteristics in FIG. 1(a) with a graph of lamp voltage V and lamp current I and shows those corresponding to the lamp characteristic LC and the output characteristics BC1 and BC2 in FIG. 1(a). It is also seen in FIG. 1(b) that the output characteristic BC1 and the lamp characteristic LC cross orthogonally and the operation point is reliably provided. Thus, it is made possible to stably light up to deep dimming.

If the gradient in the vicinity of the operation point in FIG. 1(b), namely, (change amount of lamp current I/change amount of lamp voltage V) is roughly constant, circuit design is facilitated.

For the output characteristic BC2 indicating constant-current control, if dimming is further deepened, the characteristic gradient becomes similar to that of the lamp characteristic LC and thus the operation point becomes unstable and going out easily occurs.

Figure 2:
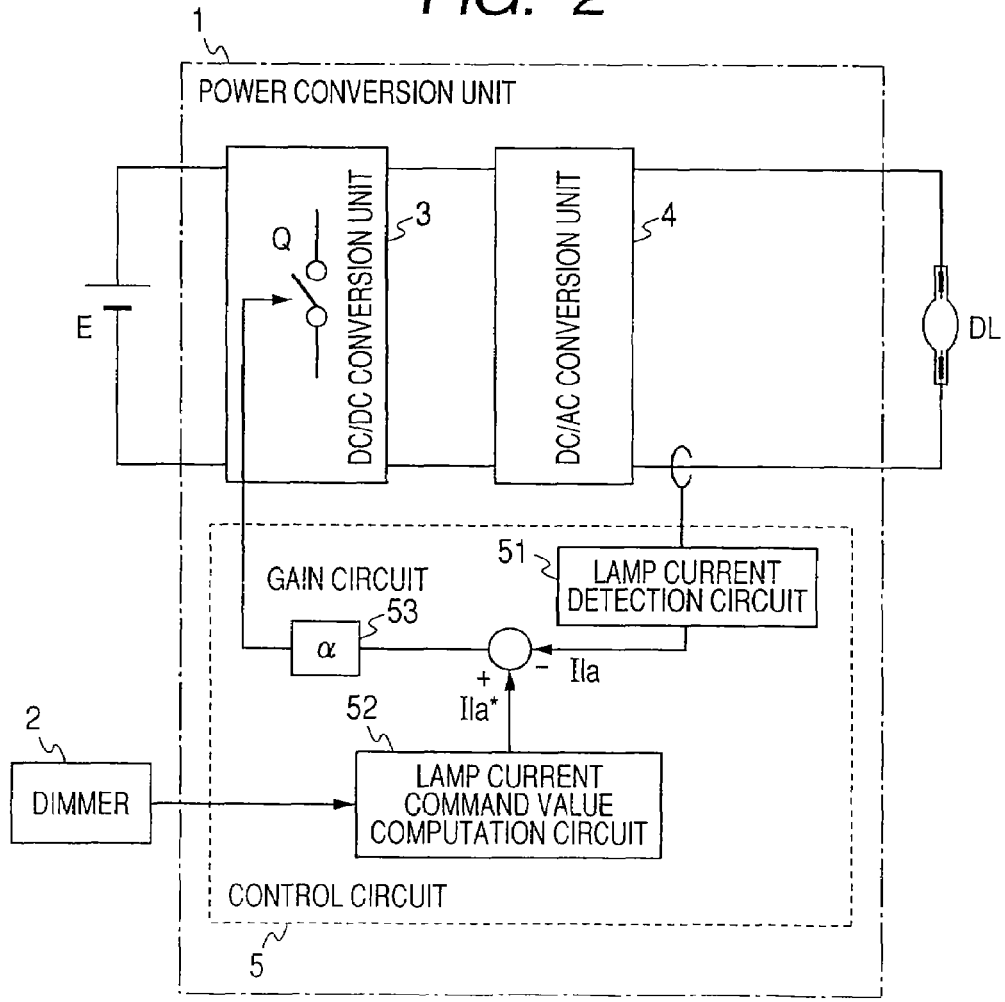
FIG. 2 is a circuit diagram to show a circuit configuration example of the first embodiment of the invention.

FIG. 2 shows the circuit configuration of the lighting device according to the embodiment. The lighting device is made up of a DC power supply E, a power conversion unit 1, a high-pressure discharge lamp DL connected to the power conversion unit 1, and a dimmer 2 for transmitting a dimming signal to the power conversion unit 1.

The power conversion unit 1 includes a DC/DC conversion unit 3 connected to both ends of the DC power supply E, a DC/AC conversion unit 4 connected to output of the DC/DC conversion unit 3, and a control circuit 5 for performing on/off control of a switching element Q of the DC/DC conversion unit 3.

The control circuit 5 is made up of a lamp current detection circuit 51 for detecting a current flowing into the high-pressure discharge lamp DL and outputting a current lamp current value Ila, a lamp current command value computation circuit 52 for receiving a signal from the dimmer 2 and computing a lamp current command value Ila*, and a gain circuit 53 for multiplying the difference between the lamp current command value Ila* and the detection value Ila by $\alpha$, and operates so that the lamp current command value Ila* and the detection value Ila roughly match by turning on/off the switching element Q of the DC/DC conversion unit 3 based on the pulse width responsive to the output of the gain circuit 53.

Figure 3:
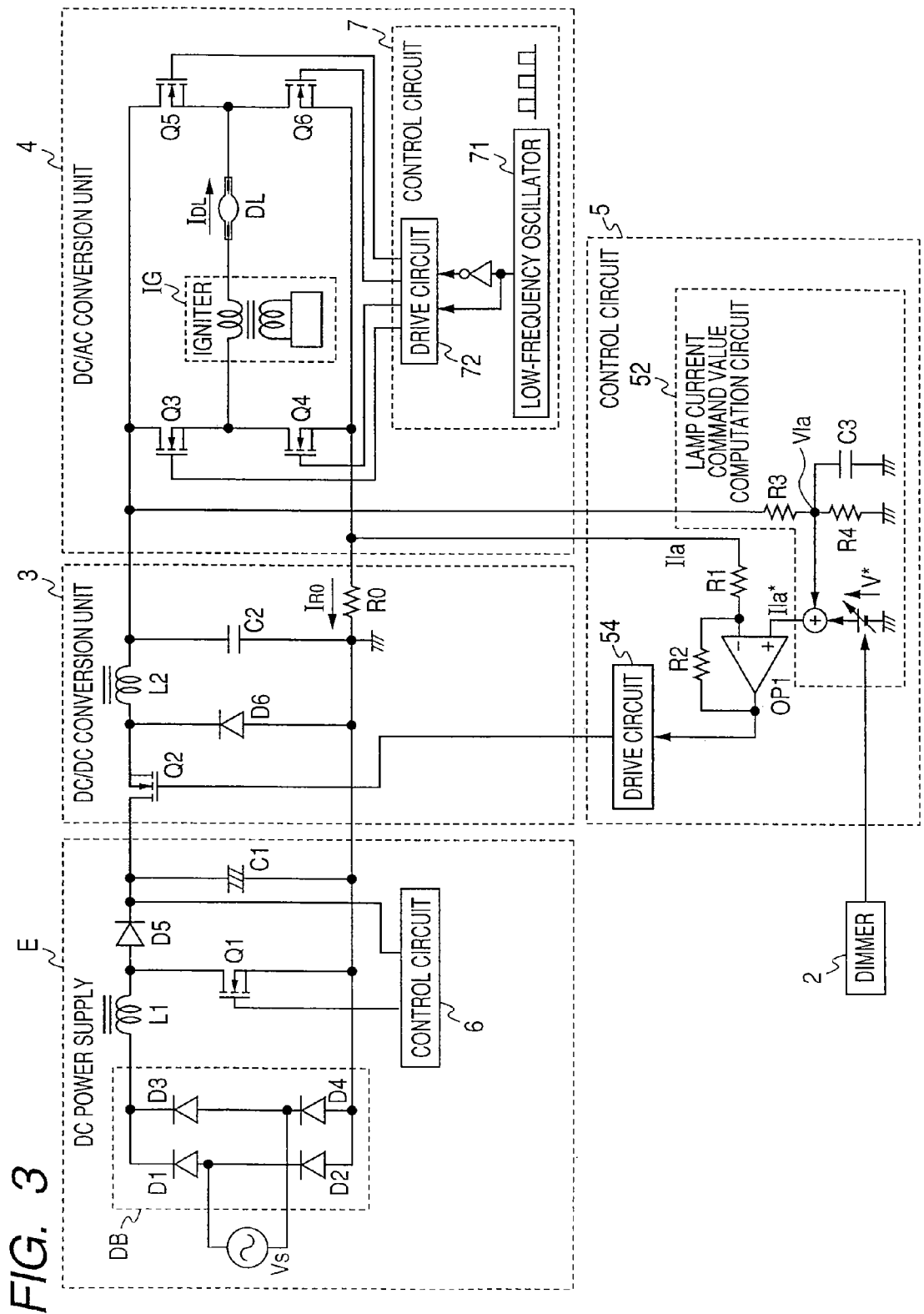
FIG. 3 is a circuit diagram to show a specific circuit configuration example of the first embodiment of the invention.

FIG. 3 is a circuit diagram to show the configuration in FIG. 2 in more detail. The DC power supply E is made up of an AC power supply Vs, a diode bridge DB made up of diodes D1, D2, D3, and D4, a step-up chopper circuit made up of an inductance L1, a switching element Q1, a diode D5, and an electrolytic capacitor C1, and a control circuit 6 of the step-up chopper circuit. The control circuit 6 detects the voltage of the electrolytic capacitor C1 and controls turning on/off of a switching element Q1.

The DC/DC conversion unit 3 is a step-down chopper circuit made up of a switching element Q2, a diode D6, an inductance L2, and a capacitor C2, and a resistor R0 for detecting lamp current is inserted in series to the ground side of the output end of the step-down chopper. The control circuit 5 adjusts turning on/off of the switching element Q2, whereby the DC/AC conversion unit 4 at the following stage can control the value of the lamp current supplied to the high-pressure discharge lamp DL.

The DC/AC conversion unit 4 is implemented as an inverter of full bridge type wherein a series circuit of switching elements Q3 and Q4 and a series circuit of switching elements Q5 and Q6 are connected in parallel and a series circuit of an igniter IG for starting the high-pressure discharge lamp DL and the high-pressure discharge lamp DL is connected between the connection point of the switching elements Q3 and Q4 and the connection point of the switching elements Q5 and Q6. The switching elements Q3, Q4, Q5, and Q6 are turned on/off according to a signal output through a drive circuit 72 from a low-frequency oscillator 71 of a control circuit 7, and a state in which the switching elements Q3 and Q6 are on and the switching elements Q4 and Q5 are off and a state in which the switching elements Q3 and Q6 are off and the switching elements Q4 and Q5 are on are repeated alternately at a frequency of about several 100 Hz. Thus, a current IDL flowing into the high-pressure discharge lamp DL becomes a rectangular wave at about several 100 Hz.

The control circuit 5 is made up of the lamp current command value computation circuit 52 for receiving a signal from the dimmer 2 and outputting a lamp current command value Ila*, an operational amplifier OP1 having a plus terminal to which the lamp current command value Ila* is input, and a drive circuit 54 for controlling turning on/off of the switching element Q2 based on the pulse width responsive to the output level of the operational amplifier OP1. A signal of the lamp current Ila detected from one end of the resistor R0 provided in the DC/DC conversion unit 3 is input through a resistor R1 to a minus terminal of the operational amplifier OP1, a resistor R2 is connected between the minus terminal and an output terminal of the operational amplifier OP1, and the operational amplifier OP1 performs feedback operation so that the lamp current command value Ila* matches the command value Ila*.

The lamp current command value computation circuit 52 adopts the sum of DC voltage source V* varied by the dimmer 2 and detection voltage V1a provided by dividing the voltage of the output end of the DC/DC conversion unit 3, namely, the lamp voltage of the high-pressure discharge lamp DL through resistors R3 and R4 as the lamp current command value Ila*. For averaging, a capacitor C3 is connected in parallel with the resistor R4. If the resistors R3 and R4 and the capacitor C3 do not exist in the circuit, the output voltage of the DC voltage source V* adjusted by the dimmer 2 becomes the lamp current command value Ila* as it is, in which case constant-current control for making the lamp current constant regardless of the lamp voltage is conducted; in the embodiment, however, the component of the detection voltage V1a responsive to the lamp voltage is also fed back and is added, so that the output characteristic of increasing the lamp current in response to the lamp voltage as shown in FIG. 1(b) can be realized comparatively easily. Although not shown in FIG. 3, the lamp voltage is also detected in a lamp light determination circuit and an anomaly protection circuit and thus they can also be used as the circuit, needless to say.

Figure 4A:
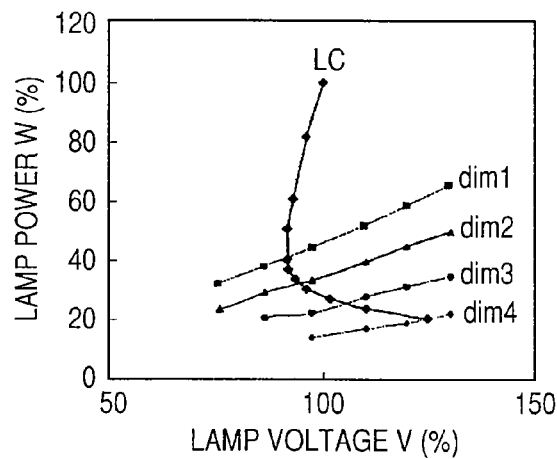
FIG. 4 is a characteristic drawing to show measurement data provided when dimming control of a high-pressure discharge lamp is performed using low luminous lighting control of the invention.
Figure 4B:
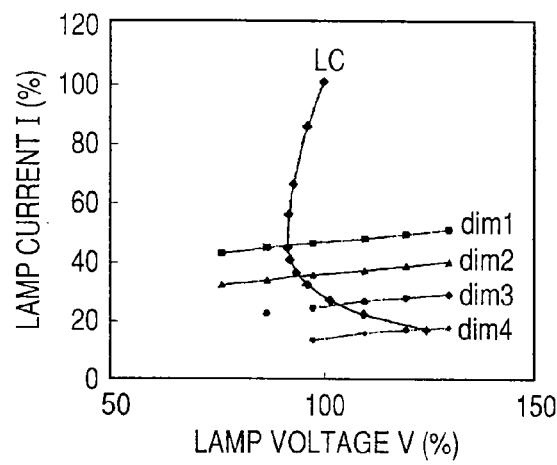

FIGS. 4(a) and 4(b) show measurement data provided when dimming control of a high-pressure discharge lamp is actually performed using the invention; FIG. 4(a) represents the lamp power W relative to the lamp voltage V at the ratio with the value at the rated lighting time of the lamp being 100% for both the voltage and the power. Lines indicated by dim1, dim2, dim3, and dim4 indicate the output characteristic of the lighting device measured as a variable resistor is connected in place of a high-pressure discharge lamp at one dimming level, and correspond to BC1 described with reference to FIG. 1(a). LC indicates the lamp characteristic when the lamp is actually lighted in place of the variable resistor, and corresponds to LC in FIG. 1(a). Breaking off of the solid line LC at the dimmer lower limit indicates going out or occurrence of fierce flicker. It is seen in the figure that going out does not occur and the lamp is stably lighted even in an area where the lamp voltage rapidly rises.

FIG. 4(b) represents the lamp current I relative to the lamp voltage V at the ratio with the value at the rated lighting time of the lamp being 100% for both the voltage and the current. Lines indicated by dim1, dim2, dim3, and dim4 indicate the output characteristic of the lighting device measured as a variable resistor is connected in place of a high-pressure discharge lamp at one dimming level, and correspond to BC1 described with reference to FIG. 1(b). LC indicates the lamp characteristic when the lamp is actually lighted in place of the variable resistor, and corresponds to LC in FIG. 1(b). It is seen in FIG. 4(b) that it shows the same characteristic as the characteristic shown in FIG. 1(b) wherein the output current of the lighting device at one dimming level grows in response to an increase in the lamp voltage.

For comparison, an experiment was conducted in a similar manner in constant-current control with addition of none of the resistors R3 and R4 and the capacitor C3 in FIG. 3. FIGS.

Figure 5A:
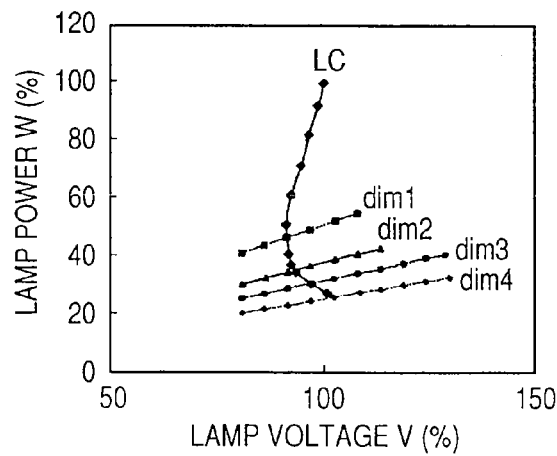
FIG. 5 is a characteristic drawing to show measurement data provided when dimming control of a high-pressure discharge lamp is performed using constant-current control in a related art.
Figure 5B:
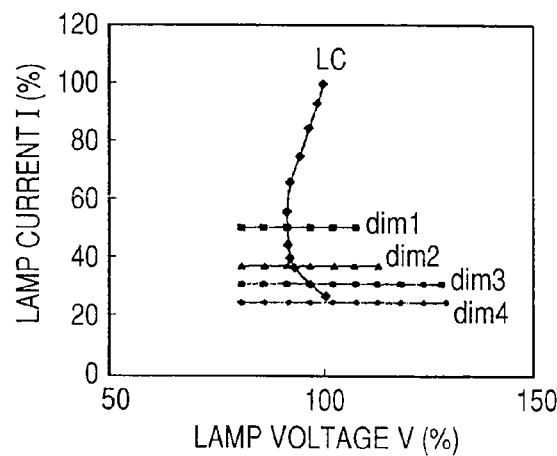

5(a) and 5(b) show the result. Symbols in FIGS. 5(a) and 5(b) are similar to those in FIGS. 4(a) and 4(b) and therefore will not be discussed again. As compared with FIG. 4, it is obviously seen that the dimming lower limit of LC at the lamp lighting time does not lower as that in FIG. 4. That is, it is obviously seen that dimming is possible up to about 20(%) of the rating of lamp power and up to about 16(%) of the rating of lamp current in the invention in FIG. 4, whereas dimming in the constant-current control in FIG. 5 does not reach them.

According to the embodiment, low luminous lighting can be stably executed in a wider range as compared with the constant-current control. The ratio of (change amount of lamp current/change amount of lamp voltage) is made roughly constant, whereby control can be facilitated and can be realized by a simple control circuit.

Second Embodiment

Figure 6A:
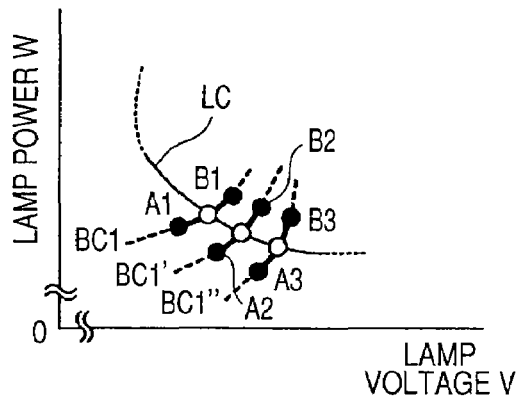
FIG. 6 is a characteristic drawing to show the operation of a second embodiment of the invention.

FIGS. 6(a) and (b) show the operation characteristics of a discharge lamp lighting device according to a second embodiment of the invention. In the figures, LC indicates the lamp characteristic and lines indicated by BC1, BC1', and BC1" indicate the output characteristic of the lighting device. FIG. 6(a) differs from FIG. 1(a) in that the gradient of the output characteristic of the lighting device is increased as dimming becomes deeper. Such control is performed, whereby the output characteristic of the lighting device and the lamp characteristic cross more orthogonally even in a low luminous area where the lamp voltage rapidly changes, so that it is made possible to maintain the operation point reliably. Although a circuit is not shown, for example, detection value V1a detected by a lamp voltage detection circuit may be squared for use, etc., and it can be accomplished comparatively easily.

Figure 6B:
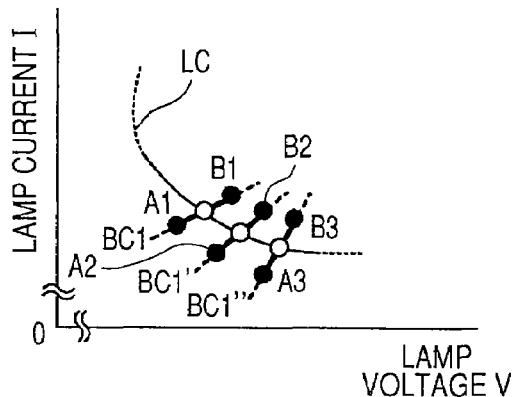

FIG. 6(b) is a graph provided by converting the vertical axis in FIG. 6(a) into lamp current I and shows those corresponding to the lamp characteristic LC and the output characteristic of the lighting device BC1, BC1', and BC1" in FIG. 6(a). It is also seen in FIG. 6(b) that when dimming is deepened, the output characteristic of the lighting device and the lamp characteristic cross more orthogonally.

According to the embodiment, if dimming is deepened, the operation point is provided reliably, so that low luminous lighting can be stably executed in a wider range.

Third Embodiment

Figure 7A:
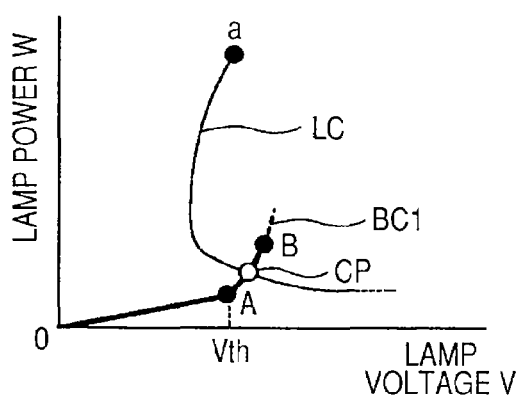
FIG. 7 is a characteristic drawing to show the operation of a third embodiment of the invention.

FIGS. 7(a) and (b) show the operation characteristics of a discharge lamp lighting device according to a third embodiment of the invention. FIG. 7(a) differs from FIG. 1(a) in that constant-current control is adopted for the output characteristic of the lighting device in the lamp voltage range of 0 to Vth. The same description as in the first embodiment applies to an area where the lamp voltage is larger than Vth, namely, an area where the lamp voltage is larger than point A of the output characteristic of the lighting device.

Generally, after a high-pressure discharge lamp is started by a starter circuit like an igniter, lamp voltage gradually grows from the vicinity of 0 (V). Output characteristic is provided reliably from voltage 0 (V), so that the lamp operation point shifts on BC1 in FIG. 7(a) and, for example, dimming starting can be executed. Although not shown in the figure, a measure of current needs to be allowed to flow for several 10 seconds just after the lamp is started and therefore FIG. 7(a) shows the characteristic after the time.

Figure 7B:
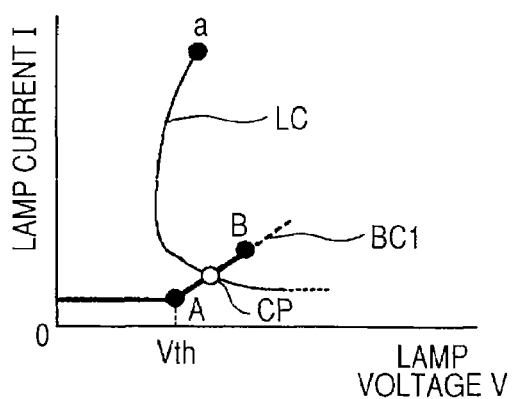

FIG. 7(b) is a graph provided by converting the vertical axis in FIG. 7(a) into lamp current I and shows those corresponding to the lamp characteristic LC and the output characteristic of the lighting device BC1 in FIG. 7(a). The lamp current is controlled constantly in the lamp voltage range of 0 to Vth and when the lamp voltage becomes larger than Vth, the lamp current command value is also increased in response to an increase in the lamp voltage.

Figure 8:
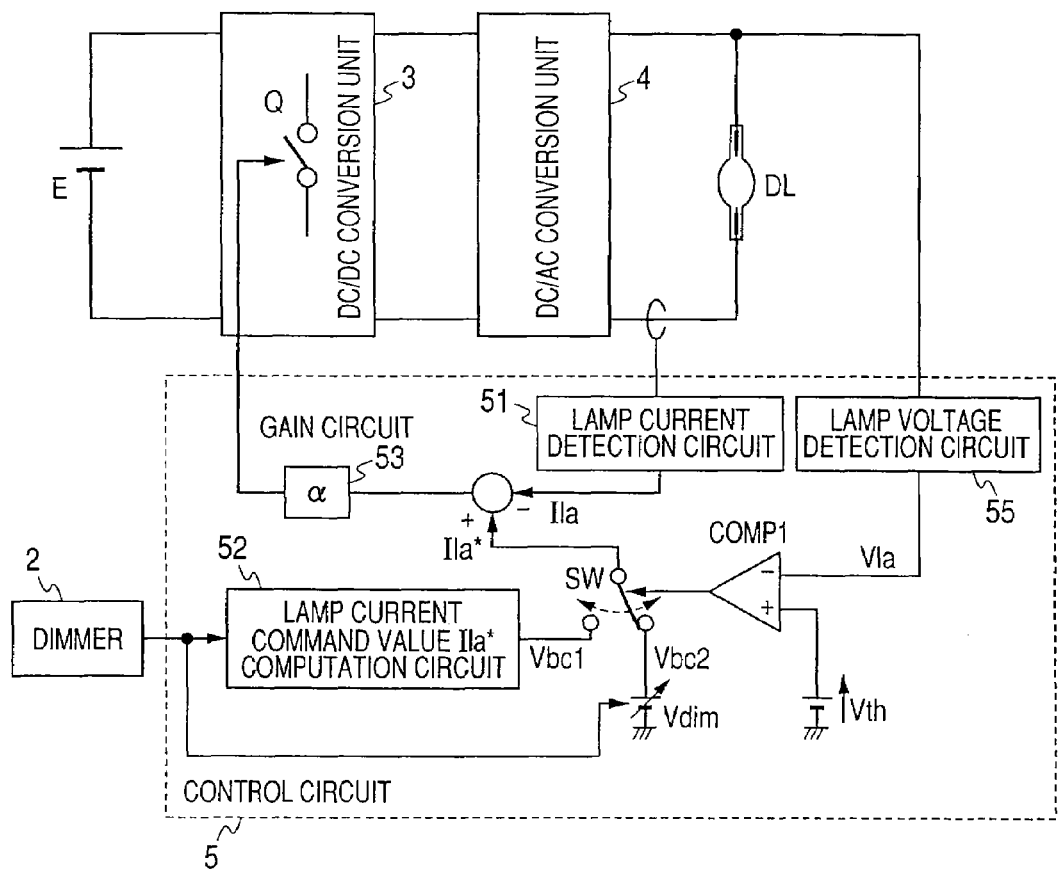
FIG. 8 is a circuit diagram to show a circuit configuration example of the third embodiment of the invention.

FIG. 8 shows the circuit configuration of the embodiment. FIG. 8 differs from FIG. 2 in that a lamp voltage detection circuit 55 for detecting the voltage across a high-pressure discharge lamp DL and a circuit made up of a comparator COMP1 for making a comparison between a detection value V1a of the detection circuit 55 and a DC voltage th and a switch SW for switching a lamp current command value Ila* between Vbc1 and Vbc2 depending on output of the comparator COMP1 are added to a control circuit 5 and that the output voltage of a variable voltage source Vdim is made variable according to a signal from a dimmer 2, whereby the value of Vbc2 can be adjusted. Using the circuit, a circuit wherein characteristic changes based on the lamp voltage Vth as shown in FIGS. 7(a) and 7(b) can be configured easily. To use the configuration illustrated in FIG. 3 as a lamp current command value computation circuit 52, a circuit made up of resistors R3 and R4 and a capacitor C3 can also be used as the lamp voltage detection circuit 55.

In the time period during which the lamp voltage detection signal V1a is smaller than predetermined DC voltage Vth, the comparator COMP1 outputs low, causing the switch SW to switch into Vbc2. When the switch SW switches into Vbc2, the lamp current command value Ila* becomes Vdim set arbitrarily by a signal from the dimmer 2, thus resulting in constant-current control responsive to each dimming level. After the lamp is started, the lamp voltage gradually increases and when the lamp voltage detection signal V1a exceeds the predetermined DC voltage Vth, the comparator COMP1 outputs high, causing the switch SW to switch into Vbc1. In this case, similar control to that previously described in the first embodiment is performed, so that low luminous lighting can be stably executed.

According to the embodiment, after start, the output characteristic of the lighting device is provided from lamp voltage 0 V to the voltage at the operation point, so that dimming starting can be executed reliably with low luminous flux, for example. It can be implemented as a simple control circuit.

Fourth Embodiment

Figure 9A:
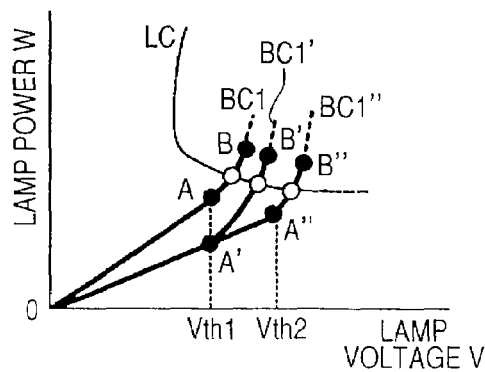
FIG. 9 is a characteristic drawing to show the operation of a fourth embodiment of the invention.

FIGS. 9(a) and (b) show the operation characteristics of a discharge lamp lighting device according to a fourth embodiment of the invention. The embodiment differs from the third embodiment in that the value of the switch point Vth of the control operation in the third embodiment is increased as dimming becomes deeper.

Figure 9B:
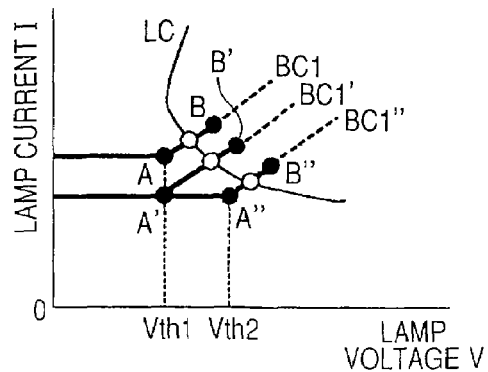

A description is given below with FIG. 9(a): In the figure, output characteristic of the lighting device BC1 passing through points A and B is the same as the characteristic shown in the third embodiment. When the lamp voltage reaches Vth1, the control operation switches at the point A in the figure and the lamp is lighted at the intersection point of the output characteristic of the lighting device BC1 and lamp characteristic LC. FIG. 9(b) is a graph provided by converting the vertical axis in FIG. 9(a) into lamp current I and shows those corresponding to the lamp characteristic LC and the output characteristic of the lighting device BC1, BC1', and BC1" in FIG. 9(a).

Next, if an attempt is made to deepen dimming with the circuit shown in the third embodiment intact, the value of Vth1 remains unchanged and thus the output characteristic of the lighting device shifts from BC1 described above to BC1'

However, in an area where the lamp voltage is larger than Vth1, the characteristics of BC1 and BC1' are characteristics close to orthogonality with the lamp characteristic LC and thus the operation point change amount is small and thus brightness change is hard to see although lighting maintenance is good. If the gradient of the line from point A' to point B' is made gentle to provide a brightness difference from BC1, a brightness difference is provided, in which case going out easily occurs.

Then, to execute deeper dimming from the output characteristic of the lighting device BC1, the switch point is changed from Vth1 to Vth2, whereby the output characteristic of the lighting device becomes as BC1" and the brightness difference can be increased with the same gradient intact as compared with BC1'. Therefore, the value of the switch point Vth is changed arbitrarily in response to the lamp voltage, so that fine adjustment of the brightness at the dimming time is made possible. If the light output difference is too large with respect to the dimming level, control may be performed in the direction of decreasing the switch point Vth in response to the lamp voltage.

Figure 10:
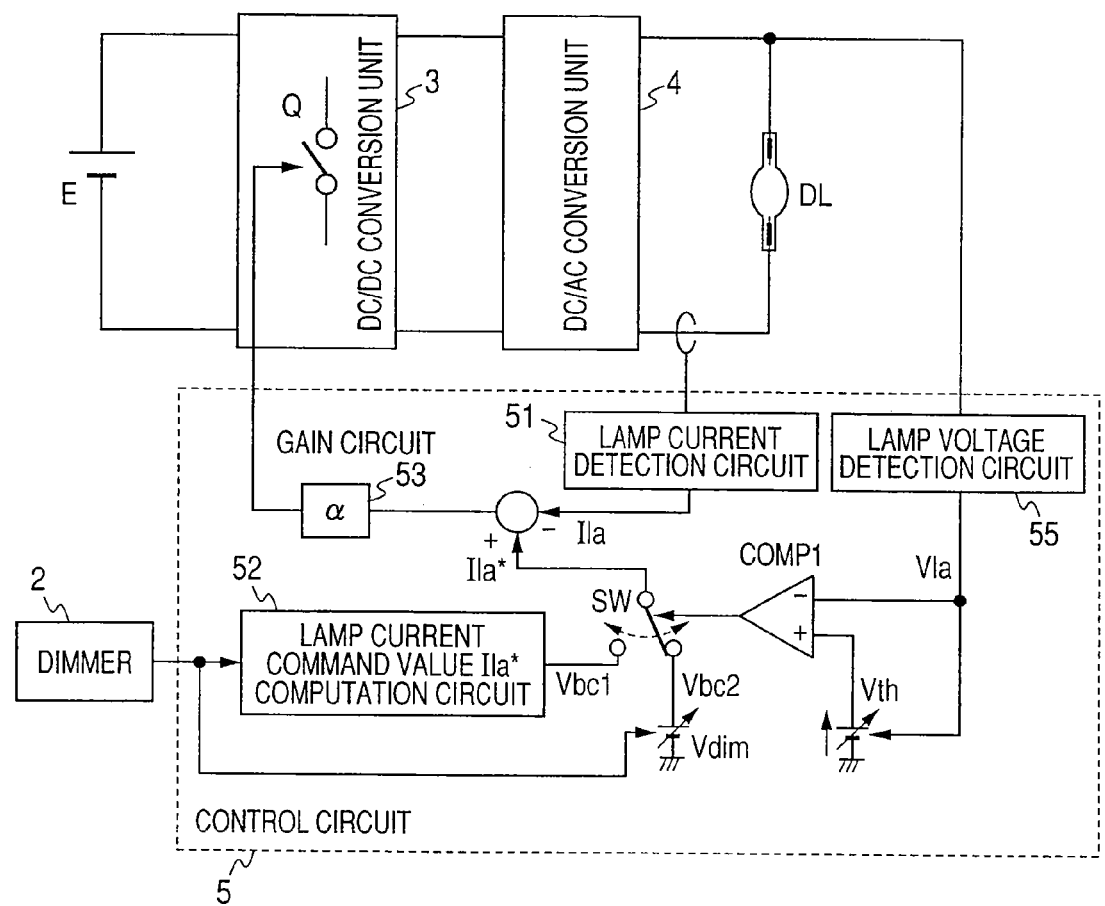
FIG. 10 is a circuit diagram to show a circuit configuration example of the fourth embodiment of the invention.

FIG. 10 shows the circuit configuration of the embodiment. FIG. 10 differs from FIG. 8 in that detection value V1a of a lamp voltage detection circuit 55 controls the DC voltage Vth determining the voltage at the switch point of the control operation. The circuit is thus configured, whereby the value of Vth also grows as the lamp voltage increases, so that the output characteristic of the lighting device like BC1" in FIGS. 9(a), (b) can be obtained.

Figure 11:
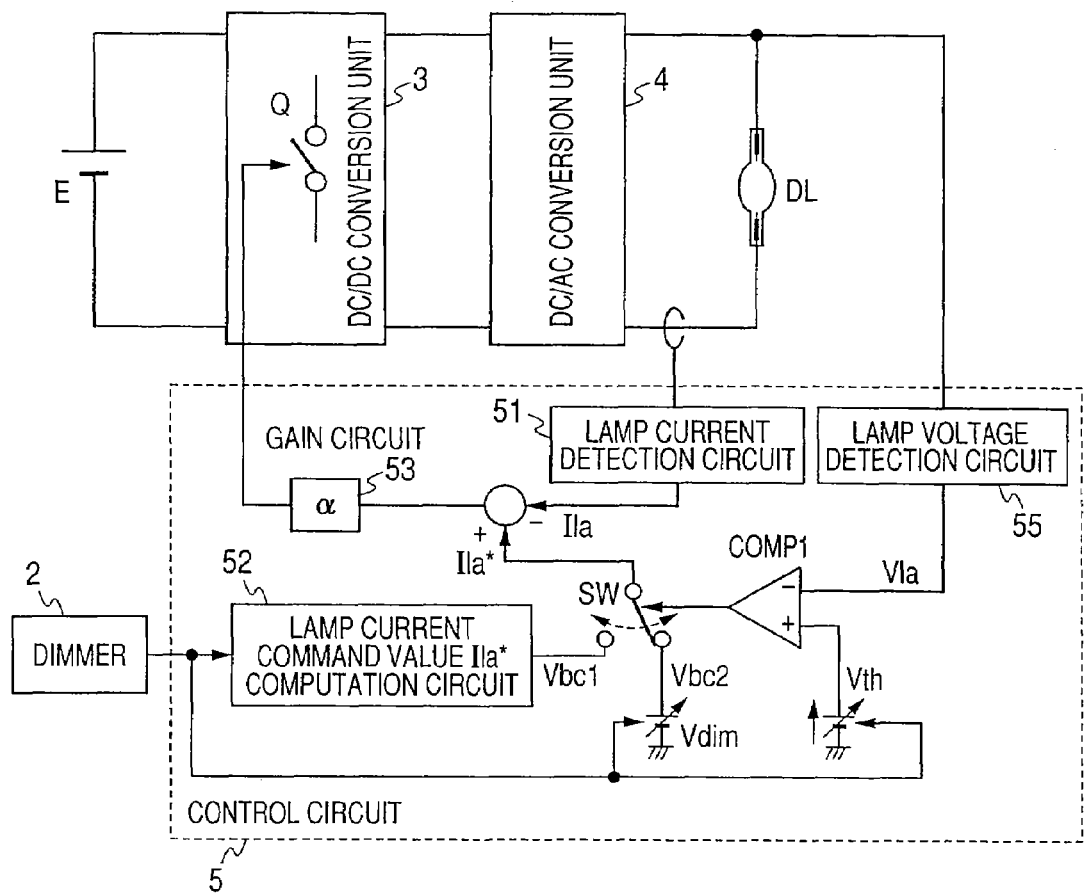
FIG. 11 is a circuit diagram to show another circuit configuration example of the fourth embodiment of the invention.

The circuit may be configured so as to perform variable control of the voltage of DC voltage source Vth in response to the magnitude of a dimming signal as shown in FIG. 11. Variable control of the magnitude of the DC voltage Vth is performed in response to the magnitude of the dimming signal, for example, in such a manner that if the dimming signal has a magnitude of passing through the point A in FIGS. 9(a), (b), the switch point is set to Vth1 and if the dimming signal has a magnitude of passing through a point A" in FIGS. 9(a), (b), the switch point is set to Vth2.

According to the embodiment, the voltage at the switch point between constant-current control and the control operation of low luminous lighting according to the invention is changed in response to the depth of dimming, so that brightness adjustment in a low luminous area can be made easily.

Fifth Embodiment

Figure 12:
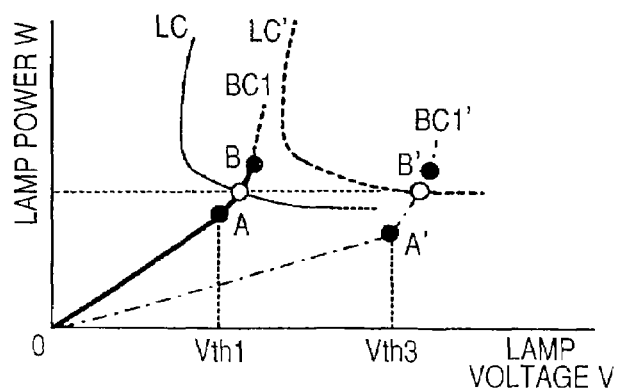
FIG. 12 is a characteristic drawing to show the operation of a fifth embodiment of the invention.

FIG. 12 shows the operation characteristics of a discharge lamp lighting device according to a fifth embodiment of the invention. The embodiment is an embodiment for reliably executing low luminous lighting even in a state in which a lamp has been lighted for a long term and is at the last stage of the life, for example.

In FIG. 12, lamp characteristic LC and output characteristic of the lighting device BC are similar to those described in the third and fourth embodiments. When the lamp is lighted for a long term, the lamp voltage becomes high and thus the lamp characteristic LC shifts to the right and before long, becomes a characteristic like LC' indicated by the dotted line. Therefore, to provide the same lamp power as that at the operation point of the lamp indicated by the intersection point of the lamp characteristic LC and the output characteristic of the lighting device BC1 if the lamp is lighted for a long term, the dimming level may be lowered in response to the lighting time and the value of a switch point Vth1 may also be increased as in the fourth embodiment, and the switch point with the value increased becomes Vth3. The output characteristic of the lighting device to switch to at Vth3 is BC1' indicated by the alternate long and short dash line, and the lamp power at the intersection point of LC' and BC1' can be set to almost the same as the lamp power at the intersection point of LC and BC1 described above.

Figure 13:
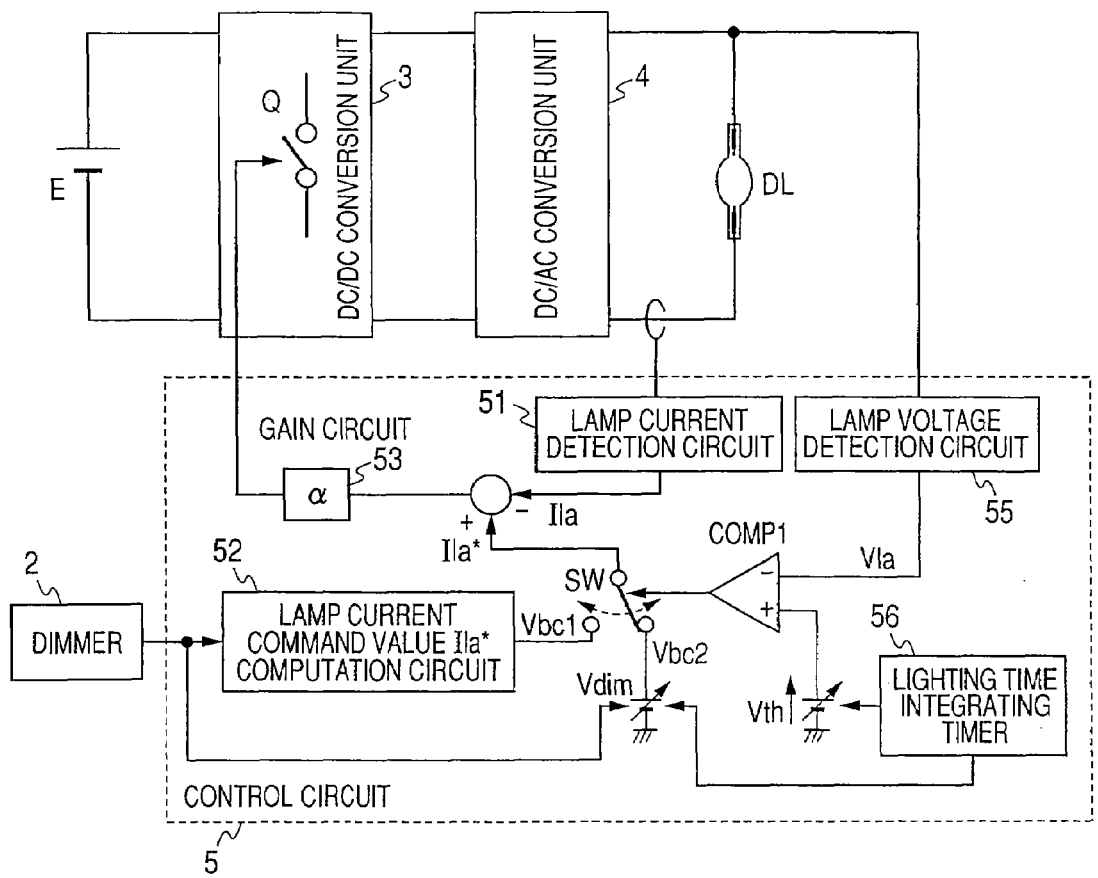
FIG. 13 is a circuit diagram to show a circuit configuration example of the fifth embodiment of the invention.

FIG. 13 shows the circuit configuration to accomplish the characteristic in FIG. 12. FIG. 13 differs from FIG. 10 in that instead of performing variable control of the DC voltage source Vth according to the lamp voltage detection value in FIG. 10, the output value of a DC voltage source Vth is gradually increased with the passage of lighting time with a lighting time integrating timer 56 and that the output value of a DC voltage source Vdim determining the gradient from a point A to a point A' in FIG. 12 is also changed according to an output signal of the lighting time integrating timer 56. The output value of the DC voltage source Vdim is decreased with the passage of the lighting time. Other points are the same as those in FIG. 10 and therefore will not be discussed again.

If the lamp is lighted for a long term like several 1000 hours, illuminance tends to lowers as a whole because of blackening of an arc tube or the like and thus in fact it is desirable that the operation point after lighting for a long term should be set a little larger than that at the initial time. That is, the lamp power in the vicinity of the dimming lower limit is set larger than that at the initial time for variation of the lamp with time, so that illuminance at the same degree as that at the initial time of lighting the lamp can be obtained.

According to the embodiment described so far, the output characteristic of the lighting device can be accomplished comparatively easily because of the characteristic that the lamp power and the lamp current increase relative to the lamp voltage; for example, even the circuit as shown in FIG. 3 can handle simply by changing a constant.

As described above, according to the embodiment, the lamp power in the vicinity of the dimming lower limit can be set to power at the same degree as that at the initial time for variation of the lamp with time. The lamp power in the vicinity of the dimming lower limit is set larger than that at the initial time for variation of the lamp with time, so that illuminance at the same degree as that at the initial time of lighting the lamp can be obtained.

Sixth Embodiment

Figure 14A:
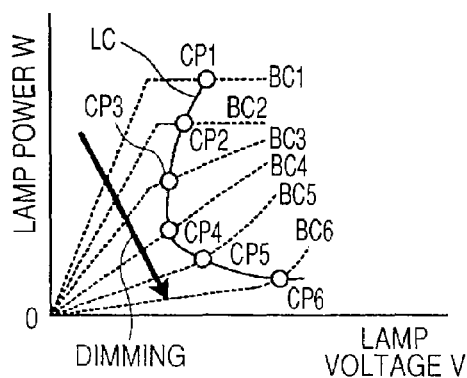
FIG. 14 is a characteristic drawing to show the operation of a sixth embodiment of the invention.

FIGS. 14(a) and (b) show the operation characteristics of a discharge lamp lighting device according to a sixth embodiment of the invention. The embodiment performs continuous dimming control from rated lighting to the dimming lower limit of low luminous flux and suppresses an unstable phenomenon occurring at the switching time of different control between constant-power control and constant-current control, for example.

Figure 14B:
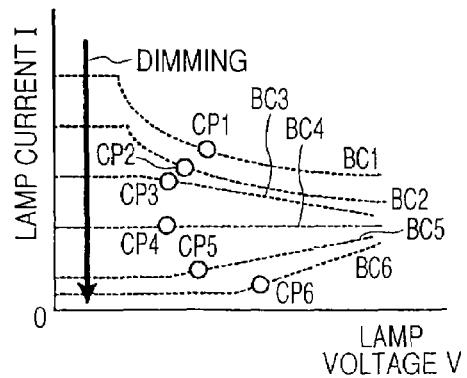

A detailed description is given below: In FIG. 14 (a), the output characteristic at a related lighting point CP1 of intersection points CP1, CP2, . . . , CP6 of lamp characteristic LC indicated by the solid line and output characteristic of the lighting device indicated by dotted lines is BC1 and the output characteristic changes as BC2, BC3, . . . , BC6 in response to deepening of dimming. FIG. 14(b) is a graph corresponding to FIG. 14(a) with the lamp current on the vertical axis; points indicated by CP1, CP2, . . . , CP6 indicate the intersection points of the lamp characteristic LC and the output characteristic of the lighting device BC1, BC2, . . . , BC6 in FIG. 14(a), so-called lamp operation points.

The BC1, BC2 output characteristic at the operation point CP1, CP2 is conventional constant-power control and is maintained almost at constant power in the vicinity of the operation point if the lamp voltage changes. The BC4 output characteristic at the operation point CP4 is constant-current control as shown in the related art example and is maintained almost at constant current in the vicinity of the operation point if the lamp voltage changes. The BC3 output characteristic at the operation point CP3 is intermediate control of the constant-power control and the constant-current control described above and the lamp power increases and the lamp current decreases in response to an increase in the lamp voltage. The BC5, BC6 output characteristic at the operation point CP5, CP6 is control of increasing the lamp current with an increase in the lamp voltage as described in the embodiments. These types of control are performed continuously in response to the dimming level, whereby smoother dimming can be realized from the rated lighting to the dimming lower limit. Since the conventional constant-power control is applied in the vicinity of the rated lighting, when the lamp voltage fluctuates, excessive power is not added to the lighting device.

Figure 15:
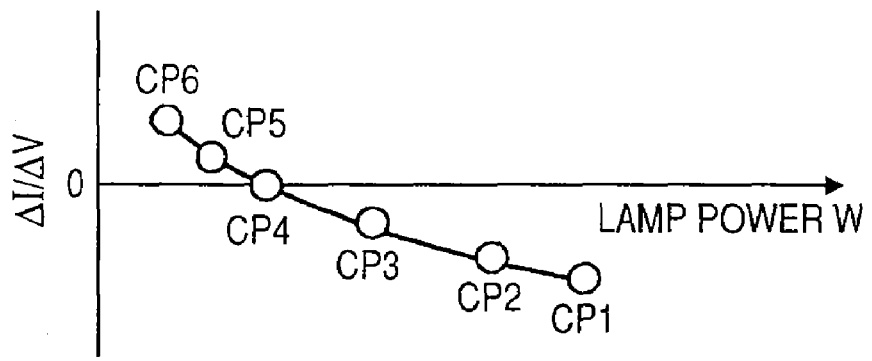
FIG. 15 is a characteristic drawing to show the operation of the sixth embodiment of the invention.

FIG. 15 is a graph indicating lamp power on the horizontal axis and lamp current change amount ΔI/lamp voltage change amount ΔV on the vertical axis and corresponds to the gradient at each operation point in FIG. 14(b). The gradient becomes a negative value in the CP1 vicinity implementing constant-power control and is gradually changed to 0 and constant-current control is accomplished at the operation point CP4 where ΔI/ΔV becomes 0. To maintain low luminous lighting from the point, the gradient is set to a positive value at the CP5, CP6 operation point.

Figure 16:
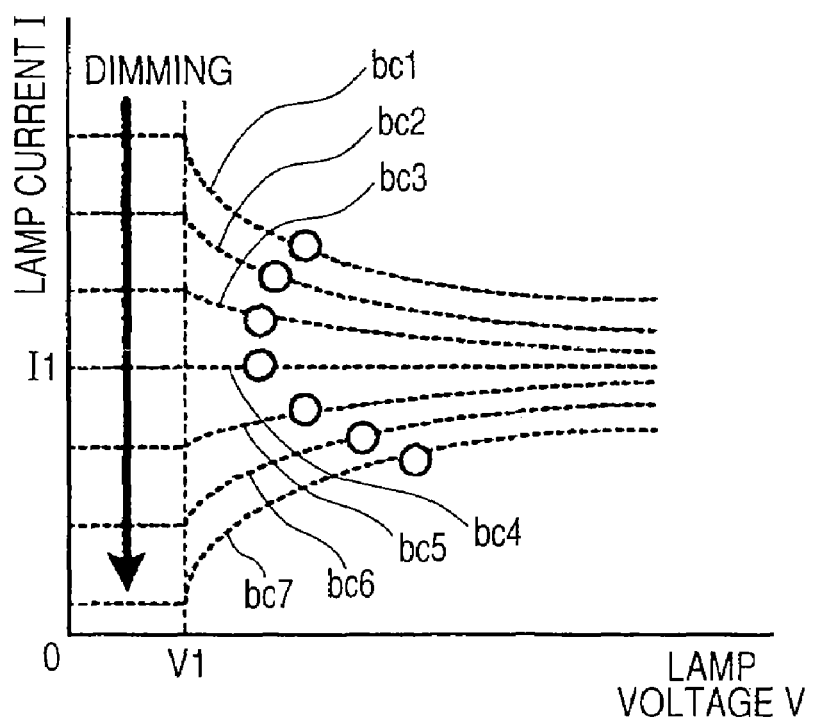
FIG. 16 is a characteristic drawing to show the operation of the sixth embodiment of the invention.

FIG. 16 shows an example of an almost similar characteristic to that in FIG. 14(b). This is characterized by the fact that the output characteristic of the lighting device becomes symmetrical with lamp current I1 as the boundary. In FIG. 16, the operation points are indicated by white circles as in FIG. 14(b). Such a symmetrical characteristic is provided, whereby when the output characteristic is put into a data table of a microcontroller, etc., for example, the symmetry can be used to about halve the data amount.

Figure 17:
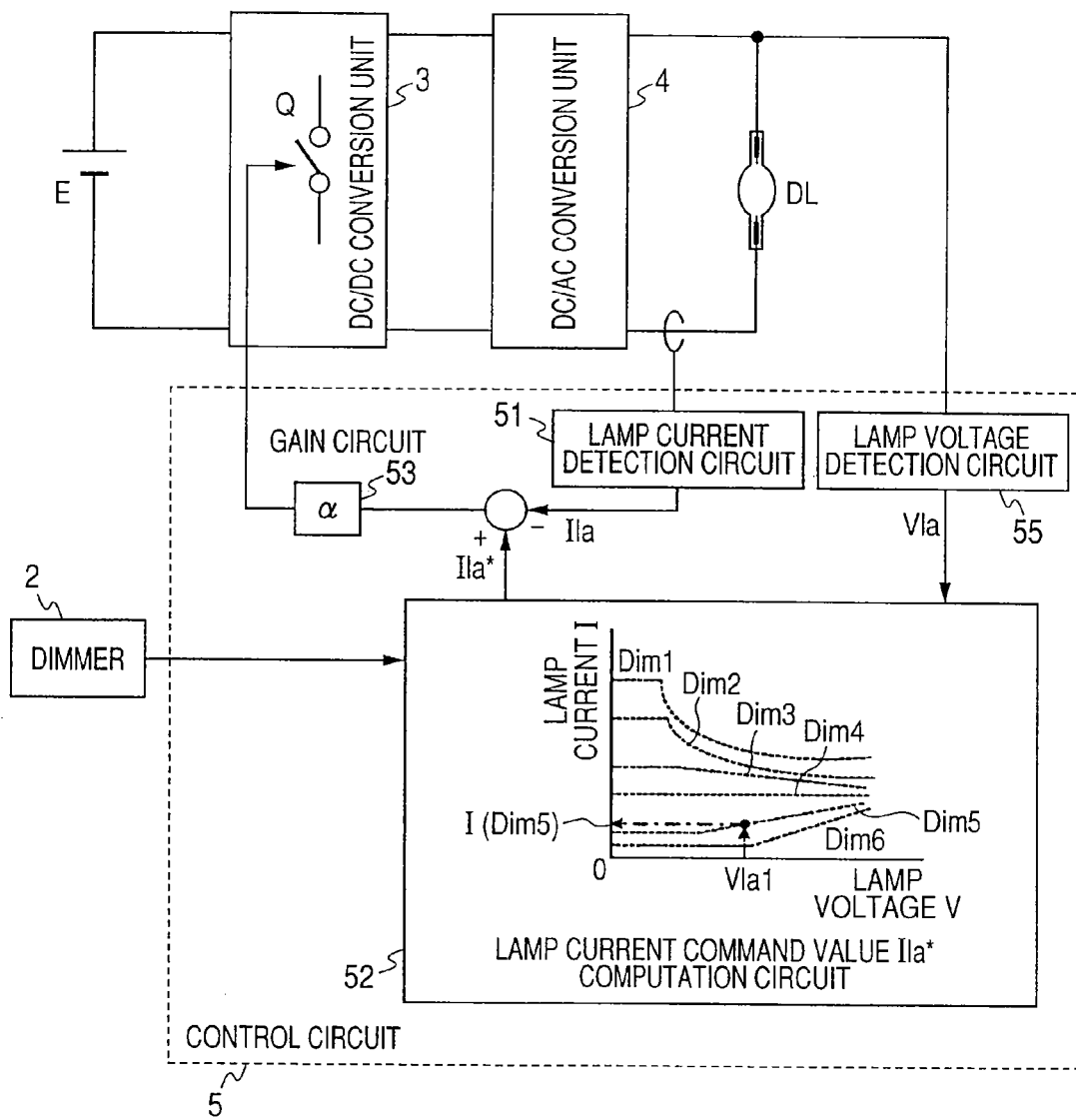
FIG. 17 is a circuit diagram to show a circuit configuration example of the sixth embodiment of the invention.

FIG. 17 shows a circuit example for accomplishing the output characteristic in FIG. 14(b). The output characteristic in FIG. 14(b) is previously retained in a data table of a microcontroller, etc., and a lamp current command value Ila* is determined by a lamp voltage detection value Vla and a dimming signal from a dimmer. In the figure, if a value of Vla1 is detected as the lamp voltage and the dimming signal from the dimmer is a level of Dim5, I(Dim5) is selected as the lamp current command value from characteristic drawing of the data table and is output as the command value Ila*. If all characteristics DIm1, DIm2, . . . , DIm6 from the rating to deep dimming are thus put into the data table, a switching circuit at Vth as used with the embodiments described above becomes unnecessary and the control circuit can be simplified.

According to the embodiment, smooth and continuous control can be executed in a wide range of the rated lighting to the dimming lower limit using the conventional constant-power control, the intermediate control of the constant-power control and the constant-current control, the constant-current control, and the low luminous lighting control described so far in combination. The data table of the microcontroller is referenced, whereby the operation switching circuit responsive to the lamp voltage, etc., becomes unnecessary and the circuit configuration can be simplified.

Figure 18:
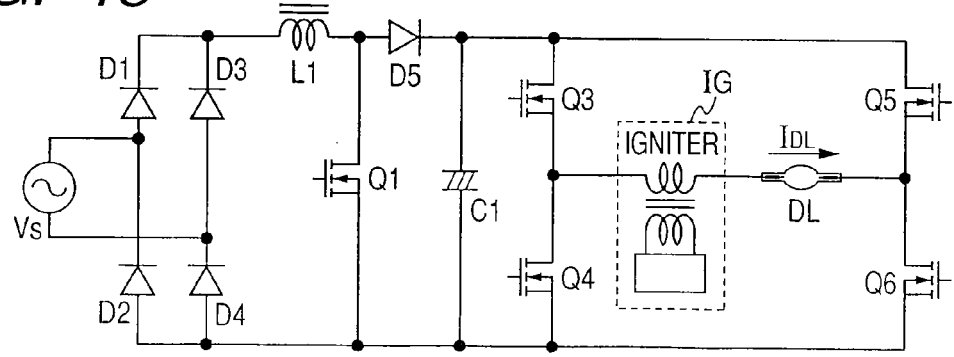
FIG. 18 is a circuit diagram to show another example of a specific circuit of a lighting device of the invention.
Figure 19:
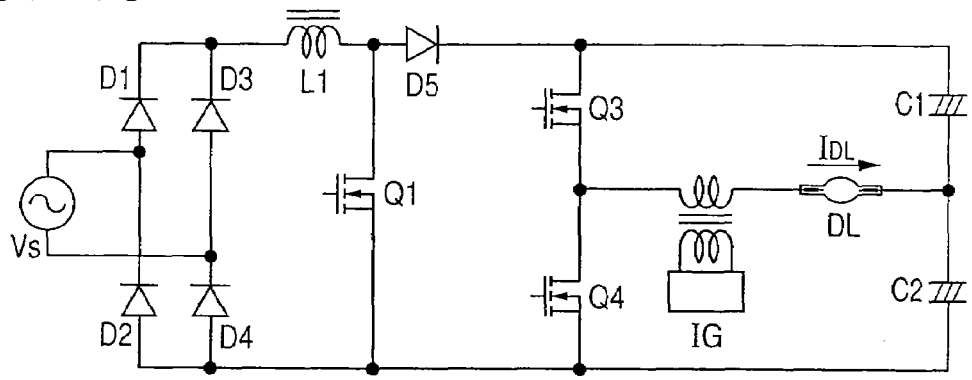
FIG. 19 is a circuit diagram to show still another example of the specific circuit of the lighting device of the invention.
Figure 20:
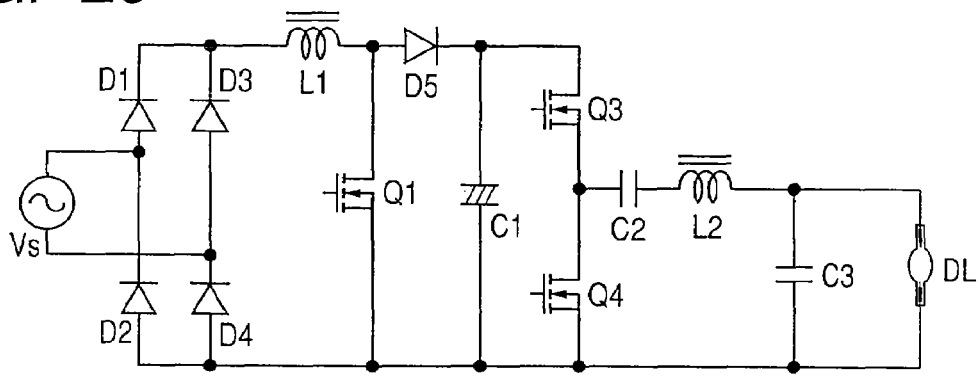
FIG. 20 is a circuit diagram to show a different example of the specific circuit of the lighting device of the invention.

In the embodiment, the circuit example of using a step-up chopper circuit, a step-down chopper circuit, and an inverter of full bridge type in combination is shown in FIG. 3 as the configuration of the main circuit, but the invention is not limited to it. For example, a circuit as shown in FIG. 18, 19, or 20 may be adopted and the waveform of the lamp current need not be a rectangular wave at about several 100 Hz and may be a high-frequency sine wave, etc., needless to say. It is essential that the control be control for providing the characteristic as shown in FIGS. 1(a), (b) as the output characteristic of the lighting device.

In a circuit example in FIG. 18, a commercial AC power supply Vs is rectified by a full-wave rectifier made up of diodes D1 to D4 and is converted into a DV voltage by a step-up chopper circuit made up of an inductor L1, a switching element Q1, a diode D5, and a smoothing capacitor C1, the DV voltage is converted into an AC voltage by a full-bridge inverter circuit made up of switching elements Q3, Q4, Q5, and Q6, and the AC voltage is supplied through an igniter IG to a high-pressure discharge lamp DL.

A circuit example in FIG. 19 uses a half-bridge inverter circuit to which a series circuit of electrolytic capacitors C1 and C2 is connected in place of the series circuit of the switching elements Q5 and Q6 in the circuit example in FIG. 18. An igniter IG is made up of a step-up pulse transformer and a pulse generation circuit and at the starting time, the pulse generation circuit generates a pulse voltage, whereby a high-voltage pulse is applied from the secondary side of the pulse transformer to a high-pressure discharge lamp DL. The DC voltage of the electrolytic capacitors C1 and C2 is subjected to variable control as turning on/off of the switching element Q1 is controlled. The configuration of the DC-DC converter is not limited to the step-up chopper shown in the figure and any desired circuit configuration of a step-down chopper, a step-up and step-down chopper (inversion-type chopper), a flyback DC-DC converter, or the like can be used, needless to say.

In a circuit example in FIG. 20, in place of igniter IG of a separate circuit, a resonance circuit made up of an inductance L2 and a capacitor C3 is connected to both ends of a switching element Q4 through a coupling capacitor C2 and at the starting time, switching elements Q3 and Q4 are turned on and off alternately in the vicinity of the resonance frequency, whereby a starting high voltage is generated and at the lighting time, the switching elements Q3 and Q4 are turned on and off alternately at the frequency responsive to the lamp power, whereby continuous output control can be executed in a wide range of the rated lighting to the dimming lower limit.

Figure 21:
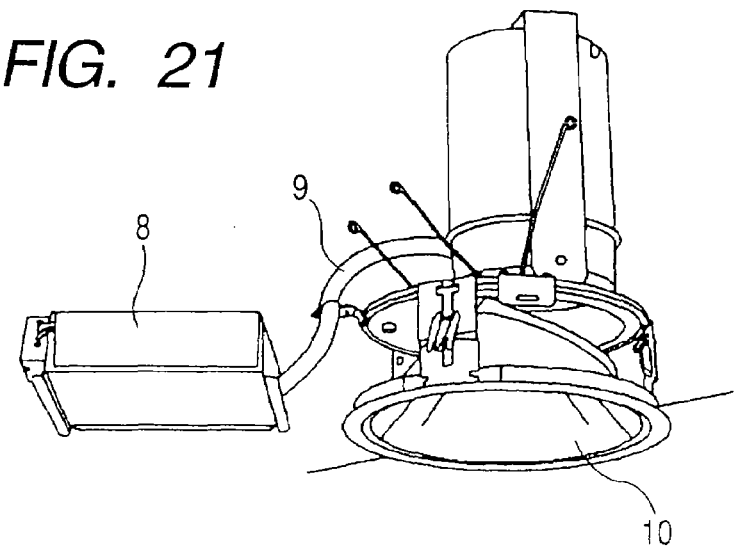
FIG. 21 is a perspective view to show an example of the appearance of a lighting fixture using the lighting device of the invention.
Figure 22:
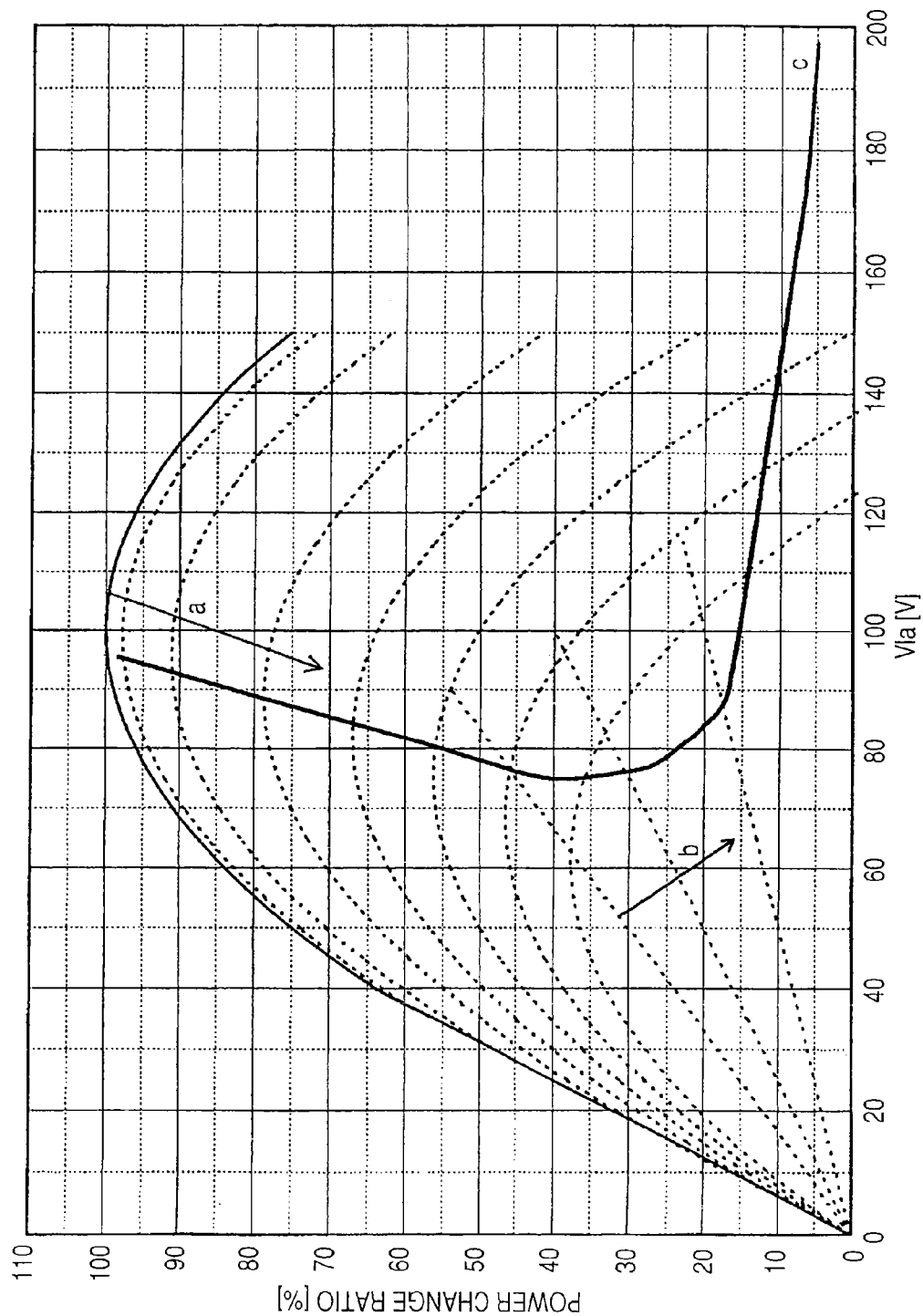
FIG. 22 is a characteristic drawing of a first related art example.
Figure 23:
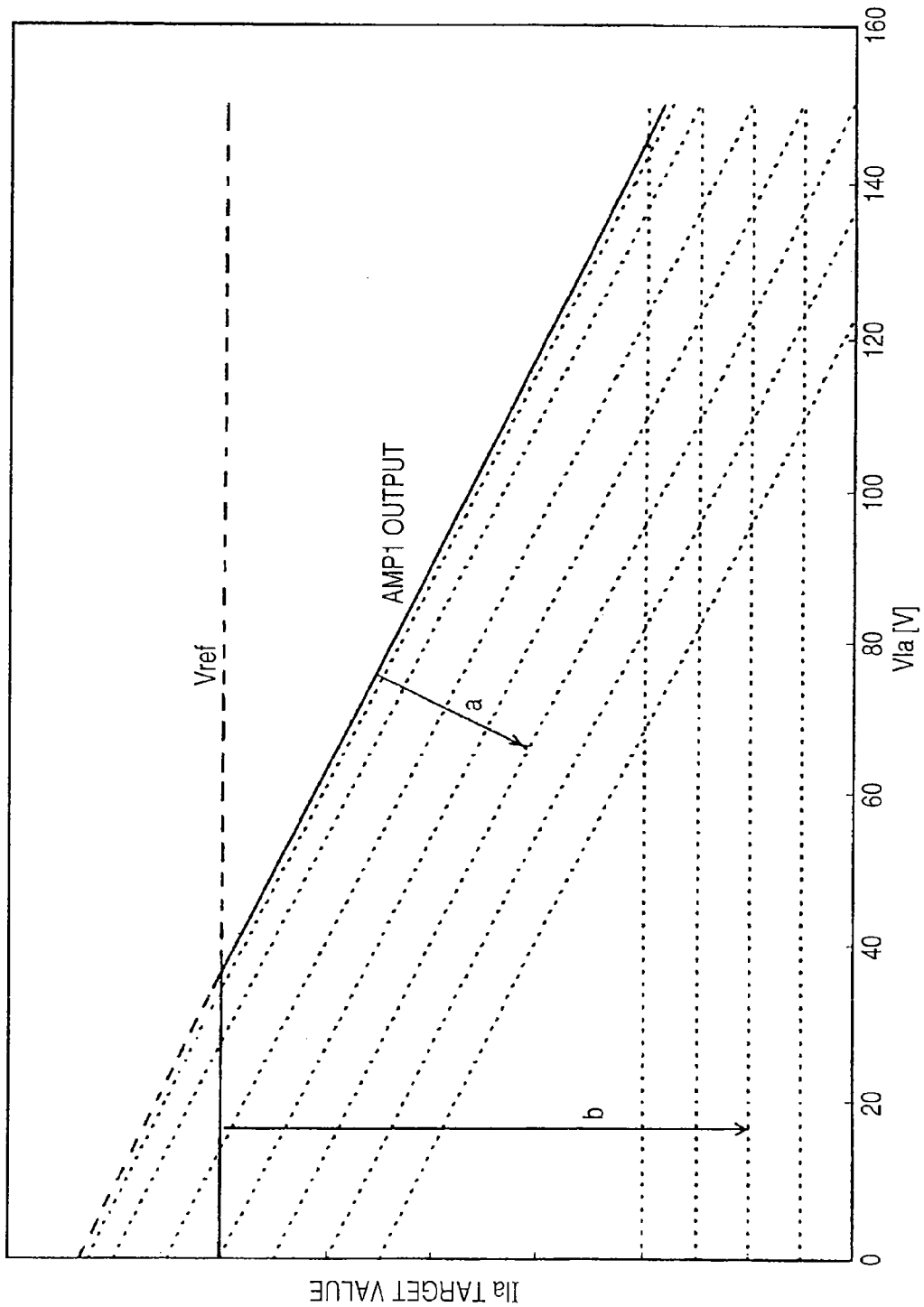
FIG. 23 is an operation schematic representation of the first related art example.
Figure 24:
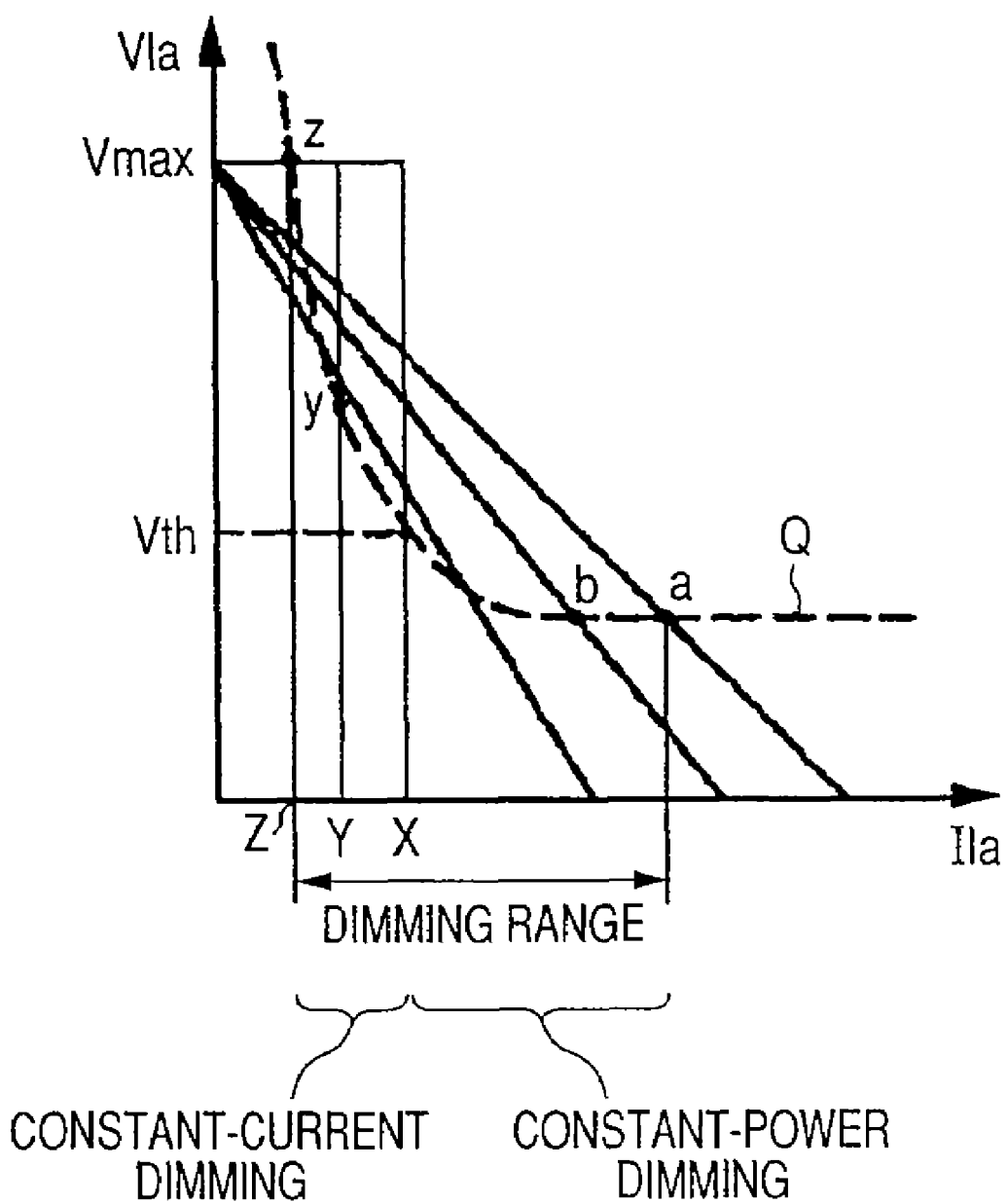
FIG. 24 is a characteristic drawing of a second related art example.

The high-pressure discharge lamp lighting device described so far is built in a lighting fixture, for example, as shown in FIG. 21 or a lighting system for controlling the lighting fixtures for use. In the figure, numeral 8 denotes an electronic ballast, numeral 9 denotes lamp wiring, and numeral 10 denotes a reflecting plate. Here, a down light is illustrated as the lighting fixture, but the high-pressure discharge lamp lighting device can also be applied to a spot light or any other desired lighting fixture, needless to say.

While the invention has been described in detail with reference to the specific embodiments, it will be obvious to those skilled in the art that various changes and modifications can be made without departing from the spirit and the scope of the invention. This application is based on Japanese Patent Application (No. 2004-091111) filed on Mar. 26, 2004, which is incorporated herein by reference.

INDUSTRIAL APPLICABILITY

According to the invention as claimed in claim 1, low luminous lighting can be stably executed in a wider range as compared with the constant-current control in the related art.

According to the invention as claimed in claim 2, change amount of lamp current/change amount of lamp voltage is made constant, whereby control can be facilitated.

According to the invention as claimed in claim 3, if dimming is deepened, the operation point is provided reliably, so that low luminous lighting can be stably executed in a wider range.

According to the invention as claimed in claim 4, after start, the output characteristic of the lighting device is provided from lamp voltage 0 V to the voltage at the operation point, so that low luminous dimming starting can be executed reliably, for example.

According to the invention as claimed in claim 5, the value of the lamp voltage at the switch point between constant-current control and the operation according to the invention is changed in response to dimming, so that brightness adjustment in a low luminous area can be made easily.

According to the invention as claimed in claim 6, the lamp power in the vicinity of the dimming lower limit can be set to power at the same degree as that at the initial time for variation of the lamp with time.

According to the invention as claimed in claim 7, smooth and continuous control can be executed in a wide range of the rated lighting to the dimming lower limit using the constant-power control, the intermediate control of the constant-power control and the constant-current control, the constant-current control, and the low luminous lighting time control of the invention in combination.

According to the invention as claimed in claim 8, 9, 10, control can be facilitated and can be realized by a simple control circuit.

According to the invention as claimed in claim 11, the data table of the microcontroller is referenced, whereby the control operation switching circuit responsive to the lamp voltage, etc., becomes unnecessary and the circuit can be simplified.

According to the invention as claimed in claim 12, the amount of data to be stored in the data table of the microcontroller can be lessened.

According to the invention as claimed in claim 13, a lighting fixture that can be dimmed up to a lower level than that in the related arts can be provided.

The invention claimed is:

1. A high-pressure discharge lamp lighting device comprising a power conversion unit for supplying AC power to a high-pressure discharge lamp as a load with a DC power supply as an input power supply for performing all lighting or dimming lighting, wherein in an area where the voltage across the high-pressure discharge lamp grows as dimming deepens, the output characteristic of said power conversion unit is a characteristic for increasing output current of said power conversion unit in response to an increase in output voltage of said power conversion unit.

2. The high-pressure discharge lamp lighting device as claimed in claim 1, wherein the ratio of the increase in the output current to the increase in the output voltage is roughly constant.

3. The high-pressure discharge lamp lighting device as claimed in claim 1, wherein the ratio of the increase in the output current to the increase in the output voltage is increased as dimming deepens.

4. The high-pressure discharge lamp lighting device as claimed in claim 1, wherein the output characteristic of said power conversion unit is a characteristic for setting the ratio of the increase in the output current to the increase in the output voltage roughly to 0 in the range in which the voltage across the high-pressure discharge lamp is from 0 to an arbitrary voltage and the output characteristic of said power conversion unit is a characteristic for increasing the output current in response to the increase in the output voltage in the range in which the voltage across the high-pressure discharge lamp is larger than the arbitrary voltage.

5. The high-pressure discharge lamp lighting device as claimed in claim 4, wherein the value of the arbitrary voltage is made larger as dimming becomes deeper.

6. The high-pressure discharge lamp lighting device as claimed in claim 4, wherein said power conversion unit has a lighting time integrating timer for counting the cumulative time of lighting and that the value of the arbitrary voltage is increased in response to the count of the lighting time integrating timer and dimming is deepened in response to the count of the lighting time integrating timer.

7. The high-pressure discharge lamp lighting device as claimed in claim 1, wherein in an area where the voltage across the high-pressure discharge lamp becomes roughly constant or becomes small as dimming deepens, the output characteristic of said power conversion unit is a characteristic for continuously changing the ratio of the increase in the output current to the increase in the output voltage from a negative value to 0 as dimming deepens.

8. The high-pressure discharge lamp lighting device as claimed claim 1, wherein said power conversion unit comprises a current detection circuit for outputting voltage responsive to current flowing into the high-pressure discharge lamp, a voltage detection circuit for outputting voltage responsive to the voltage across the high-pressure discharge lamp, and a DC voltage source for outputting voltage responsive to a dimming signal from a dimmer and has a control circuit operating so that the output voltage of the current detection circuit roughly matches the sum of the output voltage of the voltage detection unit and the output voltage of the DV voltage source.

9. The high-pressure discharge lamp lighting device as claimed in claim 1, wherein said power conversion unit has a current detection circuit for detecting current flowing into the high-pressure discharge lamp, a voltage detection circuit for detecting the voltage across the high-pressure discharge lamp, a DC voltage source for outputting voltage responsive to a dimming signal from a dimmer, a switching circuit for selecting and outputting the output voltage of the DC voltage source changing in response to the dimming signal from the dimmer until the detection voltage of the voltage detection circuit is any desired value and outputting the voltage equivalent to the sum of the output voltage of the voltage detection unit and the output voltage of the DV voltage source if the detection voltage of the voltage detection circuit is larger than the desired value, and a control circuit operating so that the current detection value detected by the current detection circuit roughly matches the output value of the switching circuit.

10. The high-pressure discharge lamp lighting device as claimed in claim 9, wherein the desired value of the switching circuit changes with the output voltage of the voltage detection circuit.

11. The high-pressure discharge lamp lighting device as claimed in claim 1, wherein said power conversion unit has a current detection circuit for detecting current flowing into the high-pressure discharge lamp, a voltage detection circuit for detecting the voltage across the high-pressure discharge lamp, a microcontroller for referencing a data table and outputting a current command value in response to the detection voltage of the voltage detection circuit and a dimming signal from a dimmer, and a control circuit operating so that the command value of the current responsive to the voltage detection value detected by the voltage detection circuit and the current detection value detected by the current detection circuit roughly match.

12. The high-pressure discharge lamp lighting device as claimed in claim 11, wherein the output characteristic stored in the data table of the microcontroller is a characteristic wherein the current command values relative to the voltage across the high-pressure discharge lamp are symmetrical with respect to a line with any desired current command value as the center.

13. A lighting fixture comprising a high-pressure discharge lamp lighting device as claimed in claim 1.

* * * * *

UNITED STATES PATENT AND TRADEMARK OFFICE
CERTIFICATE OF CORRECTION

PATENT NO. : 7,615,937 B2 Page 1 of 1
APPLICATION NO. : 10/598463
DATED : November 10, 2009
INVENTOR(S) : M. Mishima It is certified that error appears in the above-identified patent and that said Letters Patent is hereby corrected as shown below:

At column 14, line 25 (claim 8, line 2) of the printed patent, insert --in-- before "claim".

Signed and Sealed this

First Day of June, 2010

David J. Kappos
*Director of the United States Patent and Trademark Office*